United States Patent [19]

Bettman

[11] Patent Number: 4,586,018
[45] Date of Patent: Apr. 29, 1986

[54] COMBUSTION PRESSURE SENSOR

[75] Inventor: Max Bettman, Southfield, Mich.

[73] Assignee: Ford Motor Company, Dearborn, Mich.

[21] Appl. No.: 730,250

[22] Filed: May 3, 1985

Related U.S. Application Data

[63] Continuation of Ser. No. 533,483, Sep. 19, 1983, abandoned.

[51] Int. Cl.⁴ ............................................. H01L 10/10
[52] U.S. Cl. ........................................ 338/42; 338/2; 338/4; 338/36; 73/720; 73/115
[58] Field of Search ............... 338/42, 2, 4, 5, 36; 73/720, 721, 726, 727, 725, 115, 117.3, 706, 715, 716, 717; 310/338

[56] References Cited

U.S. PATENT DOCUMENTS

| | | | |
|---|---|---|---|
| 2,917,642 | 12/1959 | Wright et al. | 310/338 |
| 3,313,962 | 4/1967 | Sonderegger | 310/338 |
| 3,364,368 | 1/1968 | Sonderegger | 310/338 |
| 3,697,917 | 10/1972 | Ortho et al. | 338/2 |
| 4,016,437 | 4/1977 | Calderara et al. | 310/338 |
| 4,148,530 | 4/1979 | Calderara | 310/361 |
| 4,169,388 | 10/1979 | Teitelbaum et al. | 73/714 |
| 4,217,783 | 8/1980 | Ito et al. | 73/720 |
| 4,264,889 | 4/1981 | Yamamoto et al. | 338/42 |
| 4,321,578 | 3/1982 | Nagasu et al. | 338/4 X |
| 4,382,377 | 5/1983 | Kleinschmidt et al. | 73/706 X |
| 4,413,509 | 11/1983 | Moser et al. | 73/115 X |

FOREIGN PATENT DOCUMENTS 40390  11/1981  European Pat. Off. ............ 73/115

OTHER PUBLICATIONS

Prudenziati et al., "Characteristics of Thick Film Resistor Stain Gauges on Enamel Steel", *Sensing & Actuators*, vol. 2, No. 1, Aug. 1981, pp. 17–27.

*Primary Examiner*—Clarence L. Albritton
*Assistant Examiner*—M. M. Lateef
*Attorney, Agent, or Firm*—Peter Abolins; Keith L. Zerschling

[57] ABSTRACT

A combustion pressure sensor has a first diaphragm adjacent a combustion region for deflecting in response to the magnitude of adjacent pressure. A second diaphragm is spaced from the first diaphragm and deflects as a function of the deflection of the first diaphragm. The second diaphragm is adapted to generate a signal indicative of the deflection of the second diaphragm. A force transmitting means between the first and second diaphragms transmits movement of the first diaphragm to the second diaphragm and reduces heat transfer from the first diaphragm to the second diaphragm.

9 Claims, 6 Drawing Figures

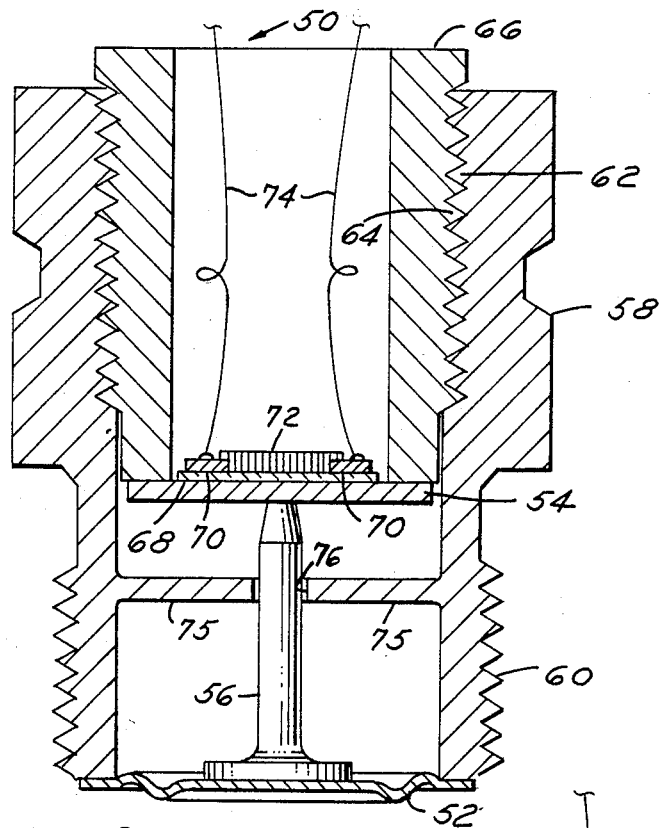
FIG. 2
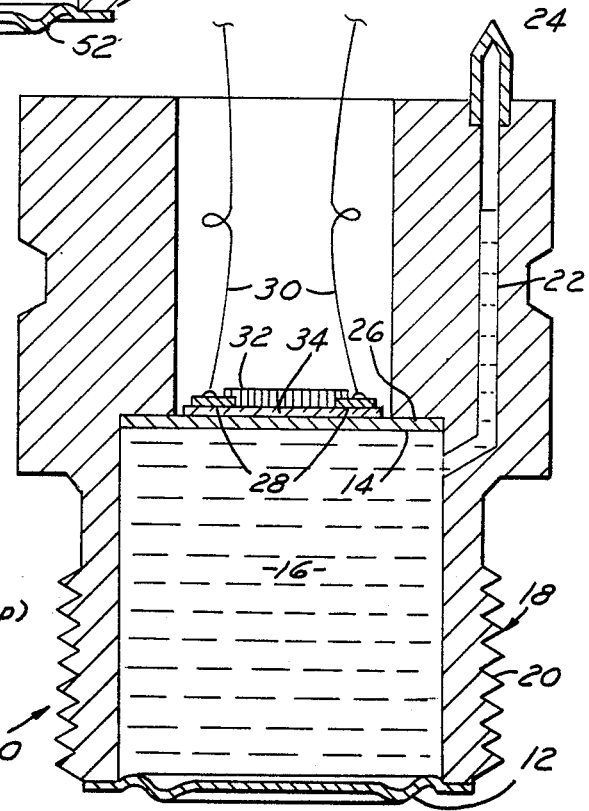
FIG. 1
FIG. 3C

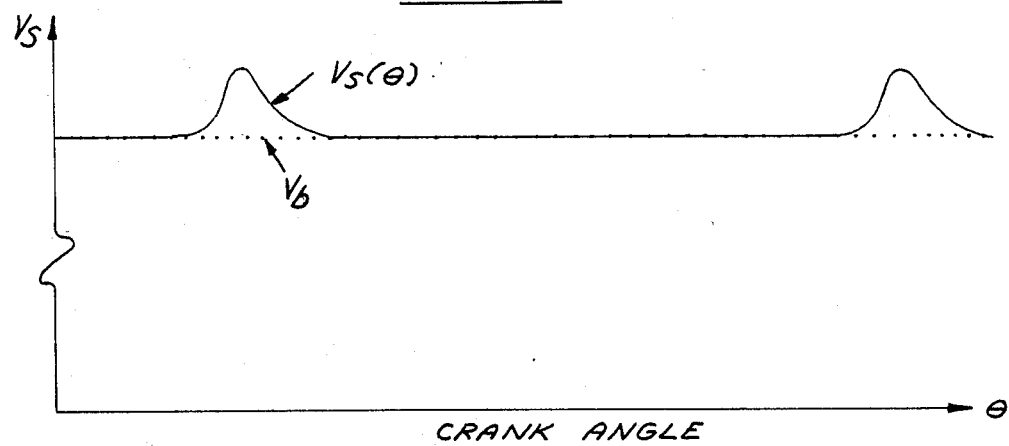
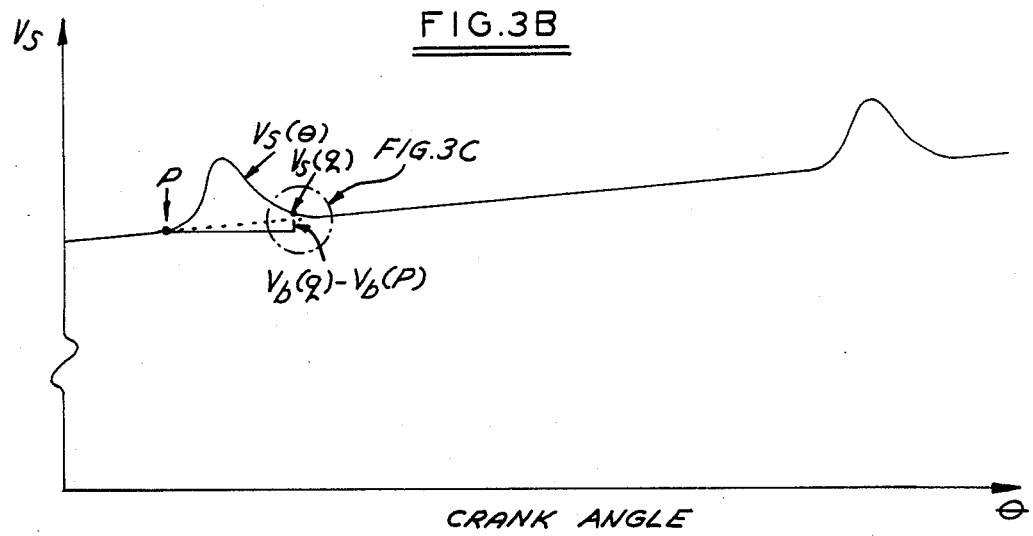

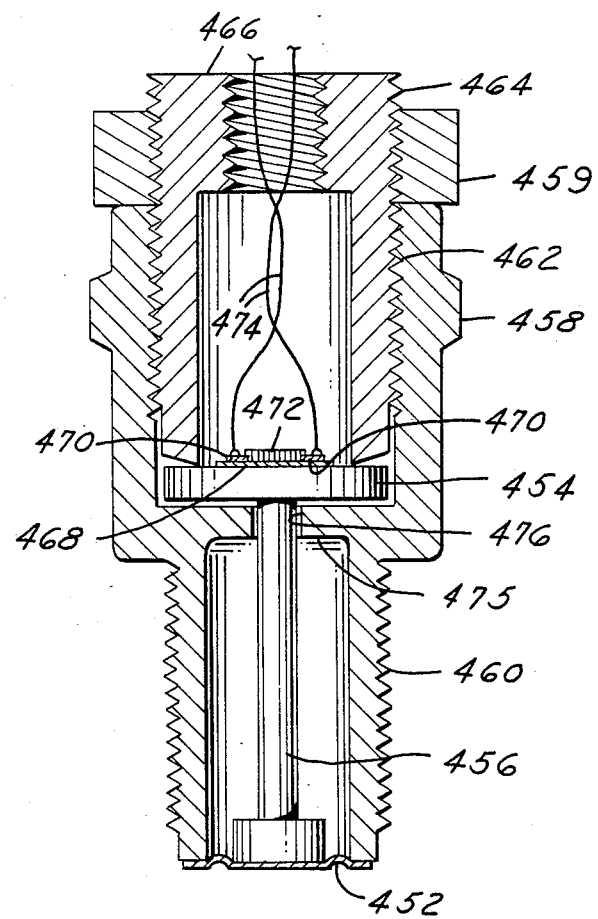

COMBUSTION PRESSURE SENSOR

This application is a continuation of application Ser. No. 533,483, filed Sept. 19, 1983 now abandoned.

BACKGROUND OF THE INVENTION

1. Field of the Invention

The present invention relates to the construction of a sensor for converting physical parameters into electrical signals.

2. Prior Art

Various strain gauges are known. For example, there has been described, in Sensors and Actuators, Vol. 2, (1981/82) 17-27, by Prudenziati, et al, the properties of strain gauges made from series ESL 3100 and DuPont series DP 7600 inks, fired onto enameled steel substrates. Such structures have appreciable, and rather irreproducible, temperature coefficients of resistance. This makes them difficult to use in the form of a temperature compensated strain gauge bridge and for the purpose of measuring slowly changing stresses or pressures. On the other hand, such structures can tolerate relatively high temperatures, such as those encountered by a combustion pressure sensor attached to the head of an internal combustion engine.

It is conventional to fit pressure diaphragms with two matched strain gauges, one in a position of maximum tensile strain, the other in a position of maximum compressive strain. Two such strain gauges then form part of a four-resistor bridge. The remaining two bridge resistors are constant, external resistors. The output of such a bridge is temperature compensated, given the following assumptions: (1) both strain gauges have precisely the same temperature coefficient of resistivity, (2) the diaphragm is isothermal, and (3) there either is no aging of either of the two strain gauge resistors, or else they age in precisely the same manner.

U.S. Pat. No. 4,217,783 issued to Ito et al teaches a magnetoresistive pressure-sensing device for automotive electronic engine control systems. The sensor is formed on a glass diaphragm by ordinary thin film techniques and produces an electrical resistance change dependent on the deflection of the diaphragm. It is expected that such thin alloy films would be unsuitable for elevated temperatures of combustion. For example, it would be expected that considerable sintering of films that thin would occur and that there would be consequent changes of film characteristics.

U.S. Pat. No. 3,697,917 issued to Orth et al teaches a method for making a semiconductor strain gauge pressure transducer. Multiple strain gauges are formed on a silicon diaphragm and connected in a Wheatstone bridge circuit arrangement in which resistance changes are measured as an indication of pressure changes. Again, such single crystal silicon piezoresistive elements are generally unsuited for high temperature applications. In contrast, they are more typically used for applications such as measuring barometric pressure and intake manifold pressure.

U.S. Pat. No. 4,169,388 to Teitelbaum et al teaches a piezoelectric technique for measuring pressure. Again, the disclosed structure has shortcomings, when used in a high temperature environment, such as the direct temperature sensitivity of the piezoelectric material, the indirect temperature effects due to the strains of the differential thermal expansion in the mount for the piezoelectric material, the general structural friability of the piezoelectric ceramic, and the high source impedance of all piezoelectric devices.

It would be desirable to have a simple, relatively inexpensive sensor which could operate in a high temperature environment and measure the combustion pressure in a cylinder of an internal combustion engine. These are some of the problems this invention overcomes.

SUMMARY OF THE INVENTION

This invention teaches gauges for measuring very transient combustion pressure pulses and mounting the gauges to keep their temperature change small during the interval of a pressure pulse. A combustion pressure sensor includes a first and a second diaphragm, and a force transmitting means between the diaphragms. The first diaphragm is adjacent the combustion chamber and deflects in response to the magnitude of an adjacent pressure. The second diaphragm is spaced from the first diaphragm and deflects as a function of the deflection of the first diaphragm and generates a signal indicative of the deflection of the second diaphragm. The force transmitting means is located between the first and the second diaphragm and transmits movement from the first diaphragm to the second diaphragm and reduces heat transmission from the first diaphragm to the second diaphragm.

Such a sensor is particularly advantageous for improved engine control via a feedback loop for each cylinder. The engine control would include the pressure sensor and a microprocessor for optimizing the pressure versus time profile of the power stroke, by adjusting engine control variables such as spark timing and air/fuel ratio.

The applicant's invention avoids the need for a conventional temperature-compensating resistor bridge, with its concomitant need for matched resistors having matched temperature coefficients of resistance. It thus obviates the need for trimming the strain sensitive resistor to an exact value, or, alternatively, having to calibrate it; and it solves the material problems of having to operate at rather high temperatures, e.g. 300° C.

The transiency of the desired measurement makes these simplifications possible. The periodicity of the pressure measurements, with nearly zero pressures in between, permit correction for the temperature-induced baseline drift of the sensor output by periodically redetermining its zero pressure value. The baseline drift is kept slow, compared to a maximum duration of the pressure pulses of about 20 milliseconds, by means of the built-in thermal isolation of the upper diaphragm from the combustion chamber.

Thus, accurate pressure measurements depend on the constancy of the gauge factor, defined as the fractional change in resistance per unit strain. The gauge factor is relatively temperature independent (about ±3% over the desired temperature range) for some classes of thick film resistors fired onto glass enameled steel substrates.

BRIEF DESCRIPTION OF THE DRAWINGS

FIG. 1 is a cross section view of a first embodiment of this invention using a heat resistant liquid to transmit force between two diaphragms;

FIG. 2 is a cross section view of a second embodiment of this invention using a spindle to transmit force between two spaced diaphragms;

FIGS. 3A and 3B are graphs of combustion pressure sensor output voltage, Vs, versus engine crank angle, $\theta$, FIG. 3B taking into account a voltage drift due to temperature changes and/or aging;

FIG. 3C is an enlargement of a portion of FIG. 3B; and

FIG. 4 is a cross section view of a third embodiment of this invention similar to the second embodiment and drawn more to scale.

DETAILED DESCRIPTION OF THE INVENTION

Referring to FIG. 1, a combustion pressure sensor 10 includes a thin lower steel diaphragm 12 which may be flat or corrugated, for additional compliance, and an upper steel diaphragm 14. A temperature tolerant liquid 16 is located between diaphragms 12 and 14 and contained within a cylindrical wall member 18. Cylindrical wall member 18 has external threads 20 for engaging threads in an opening leading to the combustion chamber of an internal combustion engine. A filling channel 22 is formed into wall 18 so as to provide external access to the volume between diaphragms 12 and 14. A pinch-off tube 24 is at the external port of filling channel 22 so as to provide a means of sealing the volume 16. Lower diaphragm 12 is bonded to wall 18. Upper diaphragm 14 is butted and sealed against inwardly projecting ledge 26 of wall 18. A glass enamel insulating layer 34 is bonded to diaphragm 14 on the side opposite from liquid 16. Fired onto this enamel are two spaced thick film conductor terminations 28, and a thick film resistor 32 which partially overlaps terminations 28. Leads 30 are also bonded to terminations 28.

Referring to FIG. 2, a combustion pressure sensor 50 has a lower diaphragm 52 and an upper diaphragm 54. Bonded to lower diaphragm 52 and extending toward and touching upper diaphragm 54 is an elongated spindle 56 for transmitting force between the two diaphragms. An outer wall 58 is generally cylindrical and has bonded thereto lower diaphragm 52. Outer wall 58 has external threads 60 for engaging threads in an access opening to the combustion chamber of an internal combustion engine. Outer wall 58 also has an interior, washer-shaped flange 75 extending parallel to and between diaphragms 52 and 54, to serve as a radiation shield against radiant heat transfer between diaphragms 52 and 54. A central opening 76 in flange 75 passes spindle 56. Outer wall 58 also has internal threads 62 for engaging external threads 64 of an inner wall 66 which screws into the inside of wall 58 and holds upper diaphragm 54 against spindle 56 thereby mounting upper diaphragm 54 without bonding to inner wall 66. Upper diaphragm 54 includes a glass enamel covering 68, a pair of spaced thick film conductors 70 and a thick film resistor 72. Two conductive leads 74 are attached to thick film conductor 70 and conduct a power signal and an output signal.

Sensors 10 and 50 can each be coupled to one cylinder of an internal combustion engine and be part of a feedback loop which contains a microprocessor to adjust combustion variables such as spark timing and air-fuel ratio to optimize the cylinder pressure profile during the power stroke. This profile is a direct measure of thermal efficiency. The shape of the profile is more important than the absolute magnitude of the cylinder pressure and an absolute accuracy of about 80 percent in the pressure measurement may be acceptable for many applications. Thus, the separate calibration for each sensor may be unnecessary. The duration of the important portion of the profile ranges from about 2 to about 20 milliseconds, depending on engine revolution rate. Sensors 10 and 50 are, additionally, capable of transmitting oscillations typical of engine knock in the frequency range of 6 to 10 kHz.

The particular resistive structures of upper diaphragms 14 and 54 can be formed using various inks (or pastes) which have sheet resistances in the range of $10^2$ to $10^5$ ohms/square. A typical dimension of such a resistor would be about one millimeter. The fractional change in resistance per unit strain, i.e. the gauge factor, is in the range of 5 to 12 and is relatively temperature independent. While the resistance of the thick films is appreciably temperature sensitive, conventional temperature compensation is not needed. This simplification is permitted by the nature of the desired measurements, and by the thermal isolation between the two diaphragms.

Referring again to FIG. 1, sensor 10 is similar to a spark plug fitting and has on the combustion side, flush with the cylinder ceiling, a thin, corrugated metallic transmission membrane serving as diaphragm 12. Above this, a layer of heat tolerant liquid 16 is inserted. The stiffer, enamel steel diaphragm 14 is above the liquid and has the thick film strain gauge on its upper surface, out of contact with liquid 16. Liquid 16 transmits pressure pulses instantaneously, while slowing down the transmission of temperature pulses such as the ones due to initial engine warmup. Lower diaphragm 12 is more delicate than upper diaphragm 14 but it is backed by an essentially incompressible liquid and is therefore effectively about as stiff as upper diaphragm 14 during positive pressure pulses. However, lower diaphragm 12 must be sufficiently stiff to be able to withstand the vacuum portion of the engine cycle.

Advantageously, sensor 10 or 50 is a two-terminal device with only one strain sensitive resistor. If the strain gauge resistor of the proposed device is powered by a constant current source and there are no temperature changes, the resulting voltage drop during engine operation across the resistor, constituting the output signal, is shown in FIG. 3A as $V_s$. The dotted line corresponds to zero gauge pressure in the cylinder, and will be referred to as the baseline. Its value is defined as $V_b = IR_o$, where $R_o$ is the unstrained resistance value of the thick film resistor, at a constant temperature. The instantaneous values of the voltage signal are:

$$V_s = IR_o(1+\delta) = V_b(1+\delta) \qquad (1)$$

where $\delta$ is the fractional change in resistance caused by the pressure-induced strain in the resistor. The upper diaphragm will be designed so that its maximum strain, at maximum expected cylinder pressure, is about 0.001, well within the elastic range of the diaphragm. For an expected gauge factor of about 10, the maximum value of $\delta$ will be about 0.01. In other words, the voltage output from the resistor will rise by no more than one percent, and the major portion of the pulse will take place in less than about 90° of crank angle, with a pulse repetition every 720° of crank angle. Thus the time-averaged voltage is only slightly above the baseline voltage:

$$\delta = G\epsilon = G'p \qquad (2)$$

where $\epsilon$ is the strain, G is the gauge factor, p the pressure, and G' is an effective gauge factor for the device, incorporating the elastic properties of the upper diaphragm. G and G' are substantially temperature independent. Thus, $$p = \delta/G' = \frac{1}{G'} \frac{(V_s - V_b)}{V_b} \quad (3)$$

$V_b$ can be measured at the precise crank angle at which the pressure is known to be zero. Alternatively, the minimum voltage value, corresponding to a partial vacuum, is an excellent approximation to $V_b$. Analog circuits for capturing transient voltage minima are well known. Thus, pressure can be determined from the known constants $V_b$ and G' and from the instantaneous signal $V_s$.

FIG. 3B schematically depicts the more realistic case where $R_o$ drifts due to temperature changes and/or aging. A constant current source is assumed. The baseline voltage, $V_b = IR_o$, will drift as a function of $R_o$, a drift which has been exaggerated in FIG. 3B. The device will be satisfactory if, in the intervals between points p and q of FIG. 3B, $V_b(q) - V_b(p)$ can be kept acceptably small, relative to the magnitude of $V_s$ during the pressure pulse between p and q. FIG. 3C is an enlargement of the portion of FIG. 3B where the crank angle is equal to q, and illustrates the dimension $V_b(q) - V_b(p)$. Liquid 16 of FIG. 1 and spindle 56 of FIG. 2 slow down the rate of temperature change in the second diaphragm so that the criterion just described can be met. Given that condition, equation (3) will still apply, provided that $V_b$ is redetermined before every pressure pulse, by either of the two methods mentioned above. The subtraction and division required by the fraction $(V_s - V_b)/V_b$ would then be accomplished.

One can eliminate the division in the above fraction by using power supplies other than the constant current supply assumed above. In effect, such supplies will keep the zero-pressure baseline, $V_b = IR_o$, nearly constant, by compensating for slow changes in $R_o$ with compensating changes in the current I. The rate of change of I will, however, be constrained to be too small to affect the relatively fast pressure induced voltage pulse. Actually, such a supply will tend to keep the time average of the voltage signal, rather than the true baseline voltage, constant. These two quantities are, however, within a few percent of each other. One skilled in the electronic arts can design such a power supply.

Diaphragms 54 and 14, those spaced away from the combustion chamber, are advantageously formed of a steel compatible with an electronic grade glass enamel which is a good electrical insulator. Typically, a resistor paste and a conductor paste are formed on the glass enamel. A particularly advantageous steel is type 316 stainless steel which is capable of forming a good bond to electronic grade glass enamels and has a higher yield strength, after the enamelling, than typical enamelling steels. Also advantageous is the use of decarburized silicon steel which is capable of being glass enamelled, yet retains a higher yield strength, after cooling down from the enamelling temperature of about 900° C. than other known enamelling steels. Alternatively, diaphragms 54 and 14 can be formed of alumina plate or other ceramic plate onto which compatible resistor and conductive pastes are formed. Diaphragms 52 and 12 are typically very thin flat steel alloy materials with good corrosion resistance and strength at high temperatures. If desired, diaphragms 52 and 12 may also have concentric circular corrugations for added compliancy.

Referring to FIG. 4, a combustion pressure sensor 450 is similar to combustion pressure sensor 50 of FIG. 2. A lower diaphragm 452 has a corrugation or indentation extending into sensor 450 to facilitate upward movement. An elongated spindle 456 extends from lower diaphragm 452 to an upper diaphragm 454. An outer wall 458 is generally cylindrical and has bonded thereto lower diaphragm 452. Outer wall 458 has external threads 460 for engaging threads in an access opening to the combustion chamber of an internal combustion engine. Outer wall 458 also has an interior annular flange 475 extending parallel to and between diaphragms 452 and 454, to serve as a radiation shield against radiant heat transfer between diaphragms 452 and 454. A central opening 476 in annular flange 475 passes spindle 456. Outer wall 458 also has internal threads 462 for engaging external threads 464 of an inner wall 466 which screws into the inside of wall 458 and holds upper diaphragm 454 against spindle 456 thereby mounting upper diaphragm 454 without bonding to inner wall 466. The bottom of inner wall 466 is chamfered in order to define a circle of support on upper diaphragm 454. Inner wall 466 extends well above wall 458 to permit installation of a hexagonal locknut 459. Further, the upper portion of inner wall 466 has an internal thread for mounting a lead through and anchor for conductive leads 474. Upper diaphragm 454 includes a glass enamel covering 468, a pair of spaced thick film conductors 470 and a thick film resistor 472, which are all not drawn to scale.

Various modifications and variations will no doubt occur to those skilled in the arts to which this invention pertains. For example, the particular mounting of the diaphragms may be varied from that disclosed herein. Other materials can be used for the upper diaphragm. Instead of glass enamelled steel, it could be formed of other metals to which a glass enamel insulating layer, a ceramic insulting layer, or any high temperature tolerant insulating layer has been intimately bonded. A strain sensitive resistor would, in turn, be bonded to this insulating layer. Alternatively, the second diaphragm could be formed of an electrically insulating ceramic to which a strain sensitive resistor is directly bonded. The elongated spindle can be formed of various materials having low heat conductivity and low heat diffusivity. These and all other variations which basically rely on the teachings through which this disclosure has advanced the state of the art are properly considered within the scope of this invention.

I claim:

1. A combustion pressure sensor means for mounting on an internal combustion engine so as to have access to the interior of a combustion cylinder, said sensor means having:

a first diaphragm means adjacent a combustion region for deflecting as a function of the magnitude of adjacent pressure in the combustion region, and for acting as a gas tight seal between the combustion region and an interior volume of said combustion pressure sensor means;

a second diaphragm means, spaced from said first diaphragm means, for deflecting as a function of the deflection of said first diaphragm and generating a signal indicative of the deflection of said second diaphragm means;

a force transmitting means located between said first diaphragm means and said second diaphragm means for transmitting movement from said first diaphragm means to said second diaphragm means, and for reducing the speed and amplitude of heat transmission from said first diaphragm means to said second diaphragm means; and said second diaphragm including a steel member having a portion coated with an electrically insulating glass enamel, upon which is formed a thick film piezoresistor for use as a thick film resistive strain gauge and overlapping thick film conductor terminations for use as electrically conductive contacts, said thick film piezoresistor having a baseline resistance which can be temperature compensated by resistance measurement between successive combustion firings in the interior of the combustion cylinder.

2. A combustion pressure sensor means as recited in claim 1 wherein said second diaphragm includes type 316 stainless steel for forming a bond to said glass enamel.

3. A combustion pressure sensor means as recited in claim 1 wherein said second diaphragm includes decarburized silicon steel, which is adapted to be glass enamelled.

4. A combustion pressure sensor means as recited in claim 1 wherein said second diaphragm includes a ceramic plate onto which resistor and conductor pastes are screen-printed and fired for forming a strain sensitive piezoresistor with electrical connectors.

5. A combustion pressure sensor as recited in claim 1 wherein said first diaphragm means is a relatively thin, flat, steel alloy material having relatively good corrosion resistance and strength at high temperatures.

6. A combustion pressure sensor as recited in claim 5 wherein said first diaphragm includes concentric circular corrugations for added compliancy.

7. A combustion pressure sensor as recited in claim 1 wherein said force transmitting means is an elongated spindle extending between said first diaphragm means and said second diaphragm means.

8. A combustion pressure sensor as recited in claim 7 further comprising a radiation shield means positioned between said first and second diaphragm means for reducing the amount of radiant heat transfer between said first and second diaphragm means and for permitting axial movement of said elongated spindle.

9. A method of sensing combustion pressure in the interior of a combustion cylinder of an internal combustion engine with a combustion pressure sensor including the steps of:

sealing a gas flow passage between the interior of the combustion cylinder and an interior volume of the combustion pressure sensor using a first diaphragm;

deflecting the first diaphragm as a function of the magnitude of adjacent pressure in the interior of the combustion cylinder;

transmitting a force, generated by the combustion pressure, from the first diaphragm to a second diaphragm, spaced from the first diaphragm, providing some heat isolation of the second diaphragm from the first diaphragm so the magnitude of heat applied to the second diaphragm is reduced with respect to the magnitude of heat applied to the first diaphragm, generating a signal indicative of the deflection of the second diaphragm means by sensing the resistance of a thick film piezoresistor formed on an electrically insulating glass enamel coating on a steel portion of the second diaphragm; and calibrating the piezoresistor by repetitively measuring a baseline resistance between successive combustion firings in the cylinder when the cylinder pressure is known, the difference between the magnitude of the baseline resistance and the measured resistance during cylinder combustion pressure measurement being indicative of the cylinder combustion pressure.

* * * * *